United States Patent
Yoshimura

(10) Patent No.: US 7,390,048 B2
(45) Date of Patent: Jun. 24, 2008

(54) SHIELD MEMBER

(75) Inventor: Mitsuhiro Yoshimura, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 153 days.

(21) Appl. No.: 11/489,673

(22) Filed: Jul. 20, 2006

(65) Prior Publication Data

US 2007/0046062 A1  Mar. 1, 2007

(30) Foreign Application Priority Data

Aug. 26, 2005  (JP) .............................. 2005-246236

(51) Int. Cl.
*B62D 25/24* (2006.01)
*B60K 15/05* (2006.01)
(52) U.S. Cl. ..................................... 296/97.22; 296/208
(58) Field of Classification Search ............... 296/97.22, 296/208
See application file for complete search history.

(56) References Cited

U.S. PATENT DOCUMENTS 5,165,749 A * 11/1992 Sheppard .................. 296/97.22
6,033,006 A * 3/2000 Bovellan et al. .......... 296/97.22
6,435,233 B1 * 8/2002 Miura et al. ................ 141/390

FOREIGN PATENT DOCUMENTS

JP     U-07-027926      5/1995
JP     2005297848 A *  10/2005

* cited by examiner

*Primary Examiner*—Dennis H. Pedder
*Assistant Examiner*—Melissa A Black
(74) *Attorney, Agent, or Firm*—Posz Law Group, PLC

(57) ABSTRACT

A shield member comprises an outer shield portion, an inner shield portion, and a connecting portion. The outer shield portion and the inner shield portion have annular shapes. The connecting portion connecting the outer shield portion with the inner shield portion has a cylindrical shape. The shield member has a cylindrical shape as a whole. A top potion of the outer shield portion has a dam portion which protrudes in an axial direction of the outer shield portion and elongates in a peripheral direction of the outer shield portion. A surface of the dam portion and a surface of the outer shield portion form a gutter-like guiding portion. The shield member shields an outer opening of a outer side member, and shields at least one of an inner opening of an outer wheel housing and an outer periphery of an inlet filler pipe.

5 Claims, 8 Drawing Sheets

SHIELD MEMBER

BACKGROUND OF THE INVENTION

1. Field of the Invention

The present invention relates to a shield member which shields a vicinity of a fuel supply opening provided in a vehicle and inhibits mud, water, and so on from entering the vicinity of the fuel supply opening.

2. Description of the Related Art

A fuel supply opening for supplying fuel to a vehicle consists of a tip end portion of an inlet filler pipe extending from a fuel tank. The inlet filler pipe, in general, extends from the fuel tank to a direction of a wheel housing. In addition, the tip end portion of the inlet filler pipe protrudes in a space between an outer wheel housing and an outer side member through an inner opening provided in the outer wheel housing. On the other hand, an outer opening is provided in the outer side member so as to face the inner opening. Therefore, the fuel supply opening, which is the tip end portion of the inlet filler pipe, is disposed inside the outer opening. The outer opening is covered by a fuel lid openably and closably.

By the way, there is a space formed between a peripheral portion of the outer opening and an outer periphery of the fuel lid such that the fuel lid can be opened and closed. Consequently, in rainy weathers, for example, water might possibly enter a vicinity of the fuel supply opening via the space between the peripheral portion of the outer opening and the outer periphery of the fuel lid.

A technique has been proposed in order to solve this problem. In such a technique, water, which has entered from the space between the peripheral portion of the outer opening and the outer periphery of the fuel lid, is inhibited from entering the vicinity of the fuel supply opening while the fuel lid is being closed, as disclosed in Japanese Unexamined Utility Model Publication (KOKAI) No. 7-27,926, for example. FIG. 13 is a cross sectional view for schematically illustrating a vicinity of a conventional fuel supply opening of a vehicle. A fuel lid disclosed in the publication will be herein after described.

In the technique disclosed in the publication, a sealing member 162 is provided in an outer peripheral portion of a fuel lid 161. When the fuel lid 161 is closed, the sealing member 162 formed in the fuel lid 161 elastically contacts with a peripheral portion of an outer opening 160 formed in an outer side member 106, and shields a gap between the fuel lid 161 and the peripheral portion of the outer opening 160. Therefore, if the fuel lid 161 is being closed, even in rainy weathers, for example, water which has entered from the gap between the peripheral portion of the outer opening 160 and the fuel lid 161 does not reach the vicinity of a fuel supply opening 170.

However, even when this type of the fuel lid 161 is used, the fuel lid 161 is opened when supplying fuel. Consequently, when a vehicle body is wet in rainy weathers, for example, water attached to the vehicle body might slip down the body so as to drop to the vicinity of the fuel supply opening 170 via the outer opening 160. In this case, depending on where the fuel supply opening 170 is disposed, water dropped down to the fuel supply opening 170 might possibly enter the fuel supply opening 170.

Moreover, if the technique disclosed in the publication is applied, in order that the sealing member 162 elastically contacts with the peripheral portion of the outer opening 160 completely, it is necessary to make an outside diameter of the fuel lid 161 far larger than an opening diameter of the outer opening 160. This is because of a reason described below.

With the technique disclosed in the publication, the sealing member 162 comes into contact with the peripheral portion of the outer opening 160 upon closing the fuel lid 161, and it comes into apart from the periphery of the outer opening 160 upon opening the fuel lid 161. Generally, the fuel lid 161 is pivotably supported by the outer side member 106, and swings to open and close the outer opening 160. Thus, the fuel lid 161 and the sealing member 162 need to be formed as a shape which corresponds to unevenness of the opening and closing movement of the fuel lid 161. In order to correspond to unevenness of the opening and closing movement of the fuel lid 161, the fuel lid 161 needs to have the sealing member 162 shaped in a manner that the sealing member 162 can contact with the outer opening 160 at a position far closer to the outer peripheral side than an inner periphery of the outer opening 160. Accordingly, the fuel lid 161 needs to be formed to have a far larger diameter than the opening diameter of the outer opening 160.

However, in recent years, in order to upgrade the decorativeness of a vehicle, there has been a demand for making the outside diameter of the fuel lid 161 to be smaller. Accordingly, in consideration of such a circumstance, it is not preferable to enlarge the outside diameter of the fuel lid 161.

SUMMARY OF THE INVENTION

The present invention has been developed and completed in view of such circumstances. It is therefore an object of the present invention to provide a shield member which can inhibit water from entering a vicinity of a fuel supply opening without enlarging an outside diameter of a fuel lid.

A shield member, which can achieve the aforementioned object, is formed as a cylindrical shape and comprises:

an outer shield portion formed as an annular shape, and shielding an inner periphery of an outer opening formed in an outer side member in a vehicle body;

an inner shield portion formed as an annular shape, and shielding at least one of an inner periphery of an inner opening formed in an outer wheel housing of the vehicle body and an outer periphery of an inlet filler pipe disposed inside the inner opening; and a connecting portion having a cylindrical shape, and connecting the outer shield portion with the inner shield portion, wherein:

the outer shield portion is provided with a dam portion at its top portion at least thereof disposed at a top end of the outer shield portion when the shield member is assembled with the outer opening, and the dam portion protrudes in an axial direction of the outer shield portion and elongating in a peripheral direction of the outer shield portion; and a surface of the dam portion and a surface of the outer shield portion form a gutter-like guiding portion.

The shield member can preferably have one of configurations set forth in (1) to (4) below.

(1) The dam portion has a groove which opens at an outer peripheral side of the outer shield portion and elongates in the peripheral direction of the outer shield portion.

(2) The dam portion has a bottom wall portion which elongates in the axial direction of the outer shield portion from an inner peripheral end of the outer shield portion and an erect wall portion which continues from the bottom wall portion and elongates in a direction of an outside diameter of the outer shield portion.

(3) A peripheral length of the dam portion is ¼ or more of a peripheral length of the outer shield portion.

(4) The dam portion has an elastically deformable lip at its tip end. The lip elastically contacts with a rear surface of a fuel lid which shields the outer opening.

The shield member according to the present invention has the dam portion at the top portion of the outer shield portion. The dam portion protrudes in the axial direction of the outer shield portion, and elongates in the peripheral direction of the outer shield portion. And, the surface of the dam portion and the surface of the outer shield portion form the gutter-like guiding portion. Therefore, water which slipped down a body and reached a vicinity of the outer opening is guided by the guiding portion, and flows along the peripheral direction of the surface of the outer shield portion. Accordingly, even when an amount of water slipping down the body is large, the shield member according to the present invention can inhibit water from entering the vicinity of the fuel supply opening.

Further, the shield member according to the present invention directly shields the outer opening of the outer side member, and directly shields at least one of the inner opening of the outer wheel housing and the outer periphery of the inlet filler pipe. Thus, irrespective of unevenness of the opening and closing movement of the fuel lid, the shield member according to the present invention can be assembled with these members securely. Accordingly, the shield member according to the present invention can inhibit water from entering the vicinity of the fuel supply opening without enlarging the outside diameter of the fuel lid.

In the present shield member having the configuration set forth in (1), since the dam portion has the groove, the shield member according to the present invention can completely inhibit water from flowing out of the guiding portion to the outer opening. Accordingly, water can be inhibited from entering the vicinity of the fuel supply opening more reliably.

In the present shield member having the configuration set forth in (2), since the shield member according to the present invention can secure a large cross-sectional area of the groove, a large amount of water can be guided by the guiding portion. Thus, water can be inhibited from flowing out of the guiding portion to the outer opening completely. Accordingly, water can be inhibited from entering the vicinity of the fuel supply opening more reliably.

Moreover, in the present shield member having the configuration set forth in (2), there is an advantage that the shield member can be manufactured with high accuracy. This is because of a reason described below.

In order to improve the operability of the shield member when assembling with the outer opening, the inner opening, and the inlet filler pipe, it is preferable that the shield member is made of elastically deformable materials such as resin, rubber, and elastomer. The shield member made of these materials can be formed by methods such as injection molding and injection-press molding. However, depending on a shape of the dam portion, an undercut shape is formed in the shield member. As the undercut shape increases in size, a mold releasing property of the shield member deteriorates and a molding accuracy decreases. The undercut shape might be reduced by designing a parting line of a mold depending on the shape of the dam portion. However, in such a case, the freedom of the mold design deteriorates, and the molding accuracy might decrease. In the present shield member having the configuration set forth in (2), the undercut shape of the shield member reduces, such that the freedom of the mold design can be secured enough. Accordingly, the shield member can be manufactured with high accuracy.

In the present shield member having the configuration set forth in (3), since the peripheral length of the dam portion is long, water which slipped down the body and reached a vicinity of the outer opening can be guided by the guiding portion to the position spaced apart from the fuel supply opening. Accordingly, water can be inhibited from entering the vicinity of the fuel supply opening more reliably.

In the present shield member having the configuration set forth in (4), a water's entry path from outside to inside of the outer opening can be shut off by the lip. Accordingly, water can be inhibited from entering the vicinity of the fuel supply opening more reliably.

The shield member according to the present invention comprises the outer shield portion formed as an annular shape, the inner shield portion formed as an annular shape, and the connecting portion formed as a cylindrical shape and connecting the outer shield portion with the inner shield portion, and is formed as a cylindrical shape as a whole. A "cylindrical shape" indicates that a through hole is provided inside therein so as to connect through the outer shield portion, the connecting portion, and the inner shield portion. It also includes a projecting structure such as a rib and a flange which is provided on the outside and a through hole which connects the inside of the cylinder with the outside thereof. The outer shield portion shields the inner periphery of the outer opening. The inner shield portion can shield the inner periphery of the inner opening only, or can shield the outer periphery of the inlet filler pipe only. However, it is preferable that the inner shield portion shields the inner periphery of the inner opening at least. By connecting the inner shield portion with the outer shield portion by means of the connecting portion, water entered from a space between the peripheral portion of the outer opening and the outer periphery of the fuel lid and splashes of mud, water, and so on in a lower vehicle can be inhibited from entering the vicinity of the fuel supply opening. Moreover, by shielding both the inner periphery of the inner opening and the outer periphery of the inlet filler pipe by means of the inner shield portion, splashes of mud, water, and so on in the lower vehicle can be inhibited from flowing out from the side of the outer wheel housing to the side of a surface of a vehicle outer panel of the outer side member so as not to make a mess on the surface of the vehicle outer panel.

The outer shield portion can shield the inner periphery of the outer opening by means of engaging with the inner periphery of the outer opening and/or the peripheral portion of the outer opening, or can shield the inner periphery of the outer opening by means of pressure welding to the inner periphery of the outer opening and/or the peripheral portion of the outer opening, or can shield the inner periphery of the outer opening by means of being bonded with the inner periphery of the outer opening and/or the peripheral portion of the outer opening. Means for shielding the inner periphery of the outer opening other than these can be applied. Likewise, the inner shield portion can shield the inner periphery of the inner opening and/or the outer periphery of the inlet filler pipe by means of engaging with the inner periphery of the inner opening, a peripheral portion of the inner opening, the outer periphery of the inlet filler pipe, and so on. Also, the inner shield portion can shield the inner periphery of the inner opening and/or the outer periphery of the inlet filler pipe by means of pressure welding to the inner periphery of the inner opening, a peripheral portion of the inner opening, the outer periphery of the inlet filler pipe, and so on. The inner shield portion can shield the inner periphery of the inner opening and/or the outer periphery of the inlet filler pipe by means of being bonded with the inner periphery of the inner opening, a peripheral portion of the inner opening, the outer periphery of the inlet filler pipe, and so on. Means for shielding the inner periphery of the inner opening and/or the outer periphery of the inlet filler pipe other than these can be applied.

The connecting portion can be formed as a straight tube, however it is preferable to be formed as a bellow. The shield member can be changeable in shape when the connecting portion is formed as a bellow. Therefore, the shield member can absorb unevenness in the connection between the outer side member and the outer wheel housing.

The shield member according to the present invention can be made of any material, however it is preferable that, as described above, to be made of elastically deformable materials such as resin, rubber, and elastomer.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Example No. 1

Figure 1:
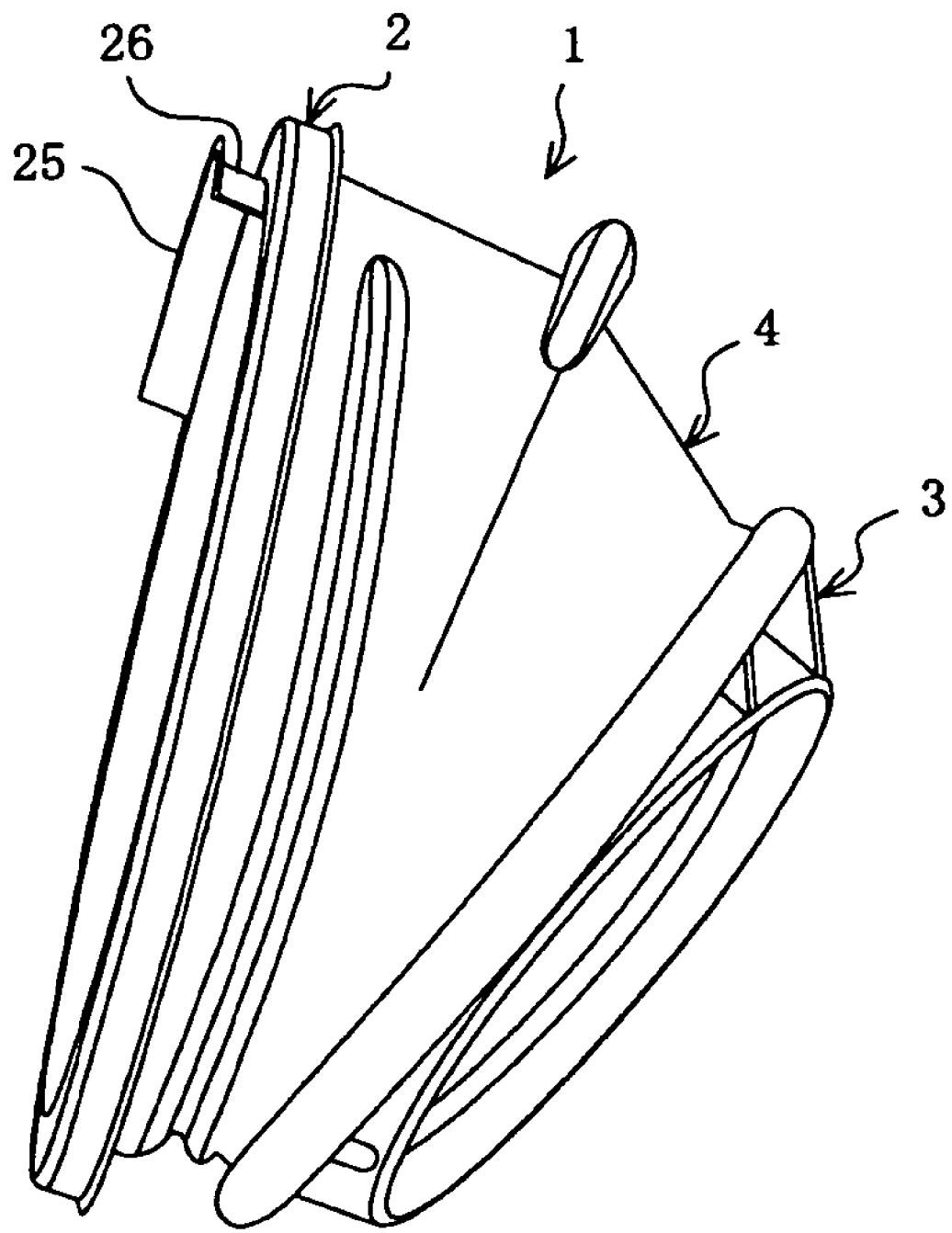
FIG. 1 is a perspective view for schematically illustrating a shield member according to Example No. 1.
Figure 2:
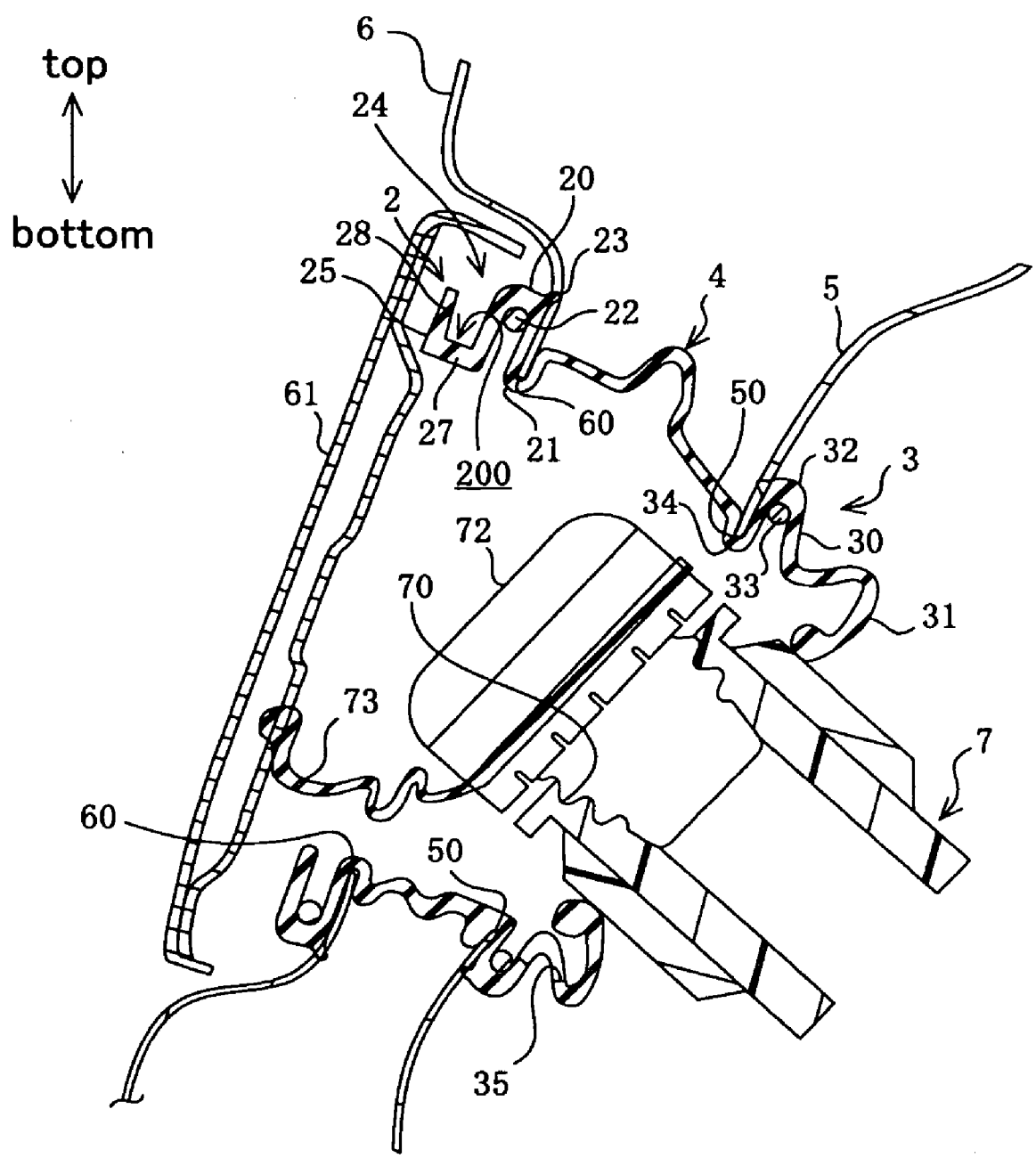
FIG. 2 is a cross sectional view for schematically illustrating the shield member according to Example No. 1 when it is assembled with an outer side member, an outer wheel housing, and an inlet filler pipe.
Figure 3:
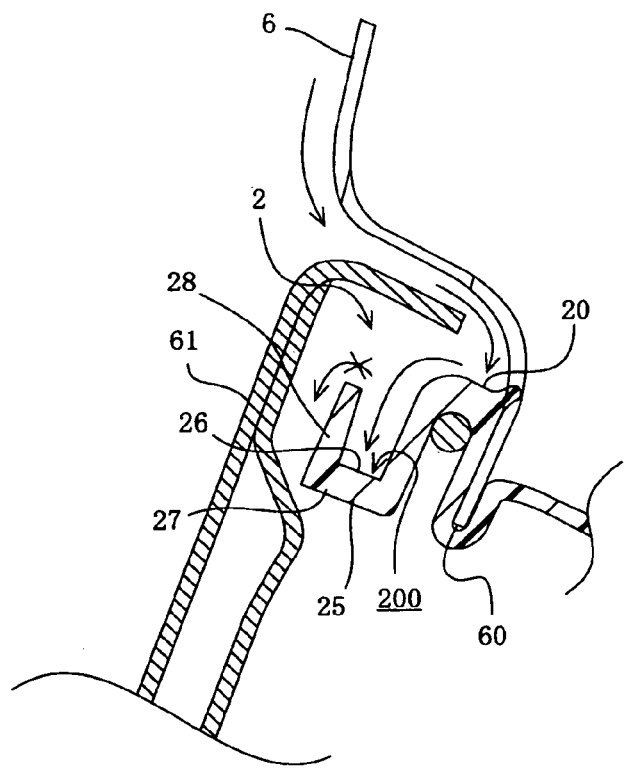
FIG. 3 is an enlarged view for a major part of the shield member according to Example No. 1.
Figure 4:
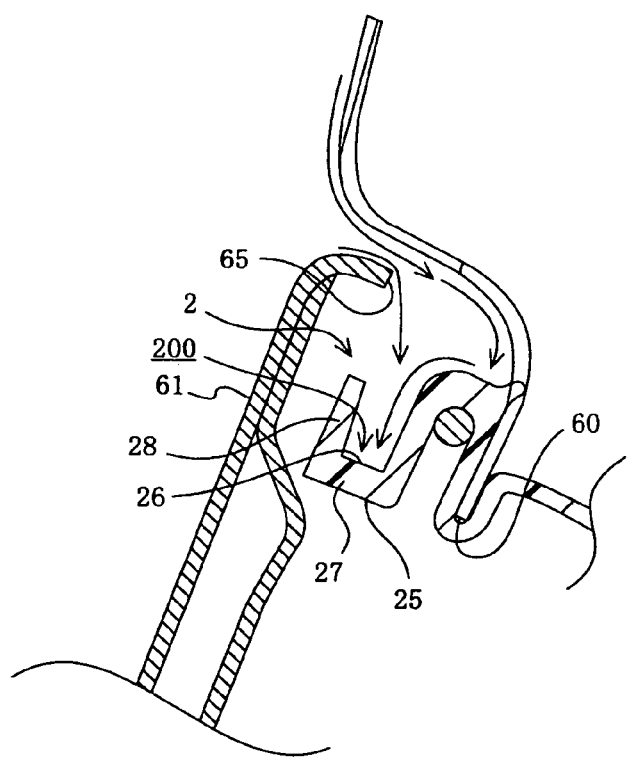
FIG. 4 is an enlarged view for a major part of the shield member according to Example No. 1.
Figure 5:
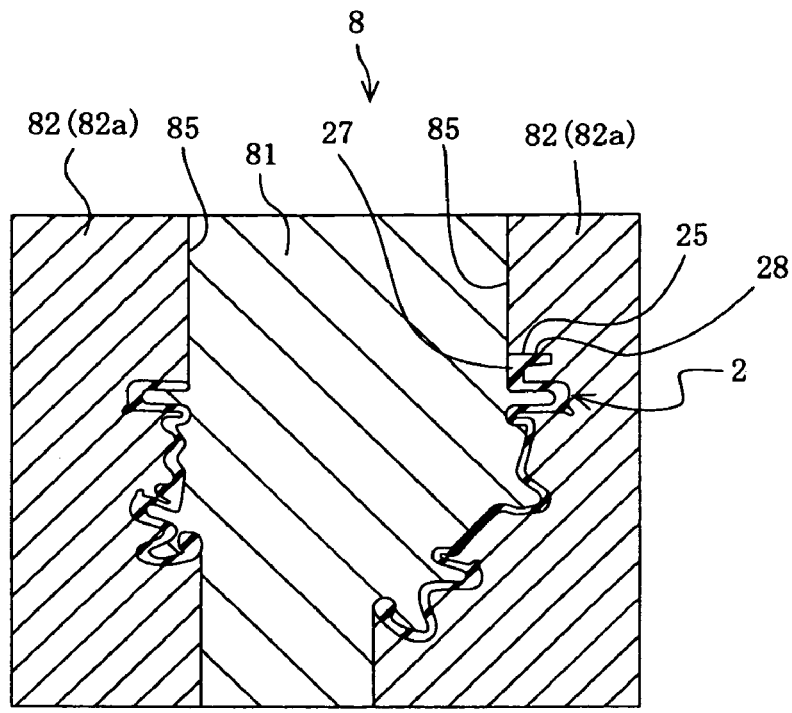
FIG. 5 is a cross sectional view for schematically illustrating a mold for molding the shield member according to Example No. 1.
Figure 6:
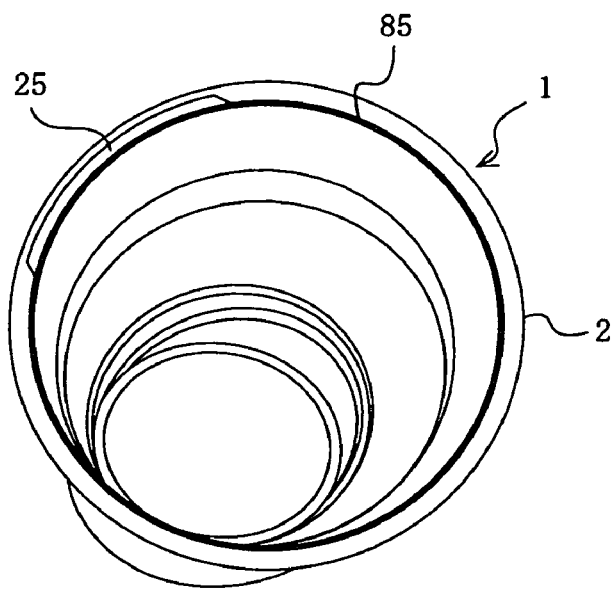
FIG. 6 is a perspective view for schematically illustrating a parting line of the mold shown in FIG. 5.

A shield member according to Example No. 1 has the configurations set forth in (1) to (3). FIG. 1 is a perspective view for schematically illustrating the shield member according to Example No. 1. FIG. 2 is a cross sectional view for schematically illustrating the shield member according to Example No. 1 when it is assembled with an outer side member, an outer wheel housing, and an inlet filler pipe. FIGS. 3 and 4 are enlarged views for a major part of the shield member according to Example No. 1. FIG. 5 is a cross sectional view for schematically illustrating a mold for molding the shield member according to Example No. 1. FIG. 6 is a perspective view for schematically illustrating a parting line of the mold shown in FIG. 5. Note that, FIG. 6 shows the parting line of the mold shown in FIG. 5 modeled on the shield member according to Example No. 1. Hereinafter, "top" and "bottom" indicate "top" and "bottom" shown in FIG. 2.

The shield member 1 according to Example No. 1 is made of rubber. The shield member 1, as shown in FIG. 1, comprises an outer shield portion 2, an inner shield portion 3, and a connecting portion 4, and has a substantially cylindrical shape in which the inner shield portion 3 has a smaller diameter than that of the outer shield portion 2. More specifically, the connecting portion 4 has a bellow-like cylindrical shape. The outer shield portion 2 and the inner shield portion 3 have substantially annular shapes. Accordingly, the shield member 1 has a substantially cylindrical shape as a whole.

As shown in FIG. 2, an inner opening 50 shaped as a circular hole is formed to pass through an outer wheel housing 5 with which the shield member 1 according to Example No. 1 is assembled. An outer opening 60 shaped as a circular hole is formed to pass through an outer side member 6 so as to face the inner opening 50. A fuel supply opening 70 consists of a tip end portion of an inlet filler pipe 7 extending from a fuel tank (not shown). The fuel supply opening 70 protrudes in a space between the outer wheel housing 5 and the outer side member 6 through the inner opening 50, and is disposed inside a fuel lid 61. The fuel supply opening 70 is covered by a cap 72 openably and closably. The cap 72 is screwed into a peripheral wall of the fuel supply opening 70 and closes the fuel supply opening 70. The outer opening 60 is covered by a fuel lid 61 openably and closably. The cap 72 is held to the fuel lid 61 by way of an elastometric tether 73.

The outer shield portion 2 shields an inner periphery of the outer opening 60 which is formed in the outer side member 6. The outer shield portion 2 has a first ring holding portion 20 which has a U-shaped cross-section substantially, and ridges on an outer peripheral side. The first ring holding portion 20 is formed on the whole periphery of the outer shield portion 2 continuously. A first pinching portion 21 which has a U-shaped cross-section substantially, and retracts in an inner peripheral side is formed in the portion on the side of the connecting portion 4 neighboring the first ring holding portion 20. The first pinching portion 21 is also formed on the whole periphery of the outer shield portion 2 continuously. In the outer shield portion 2 of the shield member 1 according to Example No. 1, the inside of the U-shape of the first pinching portion 21 shields the inner periphery of the outer opening 60. The inside of the U-shape of the first pinching portion 21 is formed slightly wider than the thickness of the inner periphery of the outer opening 60. Therefore, the outer shield portion 2 not only pinches a peripheral portion of the outer opening 60 inside the U-shape of the first pinching portion 21, but also shields the inner periphery of the outer opening 60.

A metallic first ring member 22 is held inside the U-shape of the first ring holding portion 20. The first ring member 22 has a diameter larger than that of the inner periphery of the outer opening 60. Accordingly, in the shield member 1 according to Example No. 1, the outer shield portion 2 engages with the peripheral portion of the outer opening 60 and the first ring member 22. Therefore, when the shield member 1 is pulled in the direction of the outer wheel housing 5, for example, the outer shield portion 2 does not go into the inside of the outer opening 60.

A seal lip 23 which elongates in the direction of the outer wheel housing 5 is provided on the whole periphery of the outer shield portion 2 continuously on the outer peripheral side of the first ring holding portion 20 of the outer shield portion 2. A thickness of the seal lip 23 is relatively thin and easily deformed. Thus, when the outer shield portion 2 is assembled with the outer opening 60, the seal lip 23 is pressed against the peripheral portion of the outer opening 60. Then, the seal lip 23 deforms conforming to a surface shape of the peripheral portion of the outer opening 60. Accordingly, a space between the peripheral portion of the outer opening 60 and the outer shield portion 2 is sealed.

The outer shield portion 2 has a top portion 24 which is disposed at a top end when the shield member 1 is assembled with the outer opening 60. A dam portion 25 is formed in a portion including the top portion 24 of the outer shield portion 2. The dam portion 25 protrudes in an axial direction of the outer shield portion 2, and at the same time elongates in a peripheral direction of the outer shield portion 2. A peripheral length of the dam portion 25 is ¼ or more of a peripheral length of the outer shield portion 2 (a whole periphery of the outer shield portion 2). The dam portion 25 has a groove 26 which opens at an outer peripheral side of the outer shield portion 2. The groove 26 of the dam portion 25 elongates in the peripheral direction of the outer shield portion 2. More specifically, the dam portion 25 consists of a bottom wall portion 27 and an erect wall portion 28. The bottom wall portion 27 elongates in the axial direction of the outer shield portion 2 from an inner peripheral end of the outer shield portion 2. The erect wall portion 28 continues from the bottom wall portion 27, and elongates in the direction of an outside diameter of the outer shield portion 2. In the shield member 1 according to Example No. 1, an inner surface of the dam portion 25 (the groove 26) and an end face of an axial direction of the first ring holding portion 20 form a guiding portion 200. The guiding portion 200 is formed as a gutter which is a substantially U-shape in section.

The inner shield portion 3 consists of a base 30 and a sealing portion 31. The base 30 continues from the connecting portion 4. The sealing portion 31 is a portion on the side of the trailing end in the axial direction which continues from the base 30. The inner shield portion 3 shields an inner periphery of the inner opening 50 by the base 30, and shields an outer periphery of the inlet filler pipe 7 by the sealing portion 31.

The base 30 has a second ring holding portion 32 which has a U-shaped cross-section substantially, and ridges on an outer peripheral side. The second ring holding portion 32 is formed on the whole periphery of the inner shield portion 3 continuously. Similarly to the first ring holding portion 20, a second ring member 33 which has a diameter larger than that of the inner opening 50 is held inside the U-shape of the second ring holding portion 32. Further, a second pinching portion 34 which has a U-shaped cross-section substantially, and retracts in an inner peripheral side is formed in the portion on the side closer to the connecting portion 4 than to the second ring holding portion 32 of the base 30. The second pinching portion 34 is formed on the whole periphery of the inner shield portion 3 continuously. The second pinching portion 34 pinches the peripheral portion of the inner opening 50 inside the U-shape.

In addition, the base 30 pinches the peripheral portion of the inner opening 50 by means of the second pinching portion 34, and at the same time engages with the peripheral portion of the inner opening 50 and the second ring member 33. The inner shield portion 3 does not go into the inside of the inner opening 50, since the second ring member 33 which has the diameter larger than that of the inner opening 50 is held by the second ring holding portion 32.

The sealing portion 31 elongates toward an inner peripheral side of the inner shield portion 3. An inside diameter of the sealing portion 31 is smaller than an outside diameter of the inlet filler pipe 7. Therefore, when the inlet filler pipe 7 is inserted from the side of the inner shield portion 3 to the shield member 1 after the outer shield portion 2 is assembled with the inner periphery of the outer opening 60, the sealing portion 31 stretches to conform its shape to that of the outer periphery of the inlet filler pipe 7 so as to seal the outer periphery of the inlet filler pipe 7.

A through drain hole 35 communicating the inside of the inner shield portion 3 with the outside thereof is formed in a boundary between the sealing portion 31 and the base 30. When the inner shield portion 3 is assembled with the inner periphery of the inner opening 50 and the outer periphery of the inlet filler pipe 7, the drain hole 35 is disposed in a lower part in the vertical direction of the shield member 1.

In rainy weathers, for example, water attached to a body and then slipping down the body goes through a gap between the peripheral portion of the outer opening 60 and an outer periphery of the fuel lid 61, and reaches a back side of the fuel lid 61 (adjacent to the outer opening 60). The water slips down a surface of the first ring holding portion 20 and reaches the vicinity of the dam portion 25. The shield member 1 according to Example No. 1 has the guiding portion 200 which is formed as a gutter. Accordingly, as shown in FIG. 3, the water which has reached the vicinity of the dam portion 25 flows inside the guiding portion 200 so as to be guided along the direction which the guiding portion 200 elongates, namely, the peripheral direction of the outer shield portion 2. The water guided by the guiding portion 200 flows on an outer surface of the outer shield portion 2 in the peripheral direction, slips down a surface of the outer side member 6, and is discharged outside a vehicle. Since the guiding portion 200 is formed as a gutter, the water reached the guiding portion 200 does not enter inside the shield member 1 by going over the erect wall portion 28. Accordingly, in the shield member 1 according to Example No. 1, even when an amount of water slipping down the body is large, water does not enter the vicinity of the fuel supply opening 70. Accordingly, in the shield member 1 according to Example No. 1, water does not attach to the fuel supply opening 70, the tether 73, and so on.

The guiding portion 200 can preferably be formed in a part including at least the top portion 24 in the outer shield portion 2. However, the longer a peripheral length of the guiding portion 200 (a peripheral length of the dam portion 25) is, the more reliably water can be guided to a position away from the fuel supply opening 70.

Note that, when an amount of water slipping down the body is very large, a part of water guided by the guiding portion 200 may flow into an inner surface side from the outer surface of the outer shield portion 2 and enters inside the shield member 1. However, in this instance as well, water is guided by the guiding portion 200 and flows along the peripheral direction of the outer shield portion 2, so as not to enter the vicinity of the fuel supply opening 70. Therefore, water does not attach to the fuel supply opening 70, the tether 73, and so on. Further, in the shield member 1 according to Example No. 1, since the drain hole 35 is provided in a bottom portion of the inner shield portion 3, water which has entered inside the shield member 1 is discharged downwardly to a lower direction of the outer wheel housing 5 or the outer side member 6 via the drain hole 35. Since the lower outer wheel housing 5 and the lower outer side member 6 communicate with the outside of the vehicle, water which has been discharged downwardly to the lower direction of the outer wheel housing 5 or the outer side member 6 via the drain hole 35 is discharged outwardly to the outside of the vehicle.

Moreover, as shown in FIG. 4, for instance, when the fuel lid 61 and the peripheral portion of the outer opening 60 overlap a little, water slipping down the body may dribble down to the vicinity of the outer opening 60 from an end 65 of the fuel lid 61. However, in the shield member 1 according to Example No. 1, water dribbling down from the end 65 of the fuel lid 61 to the vicinity of the outer opening 60 can be gathered by the guiding portion 200. Accordingly, in the shield member 1 according to Example No. 1, water dribbling down from the end 65 of the fuel lid 61 does not enter inside the outer opening 60 so as not to reach the vicinity of the fuel supply opening 70. When an axial length of the dam portion 25 is designed appropriately depending on the position which the end 65 of the fuel lid 61 is disposed, it is more reliable to prevent water from dribbling down from the end 65 of the fuel lid 61 and entering inside the outer opening 60. More specifically, the axial length of the dam portion 25 can preferably be designed such that the end 65 of the fuel lid 61 is disposed above the guiding portion 200 when the outer shield portion 2 is assembled with the outer opening 60.

Note that, in the shield member 1 according to Example No. 1, the outer shield portion 2 shields the outer opening 60 of the outer side member 6, and the inner shield portion 3 directly shields the inner opening 50 of the outer wheel housing 5 and the outer periphery of the inlet filler pipe 7. The outer wheel housing 5, the outer side member 6 and the inlet filler pipe 7 are immovable even during opening and closing movements of the fuel lid 61. Thus, irrespective of unevenness of the opening and closing movement of the fuel lid 61, the outer shield portion 2 shields the outer opening 60 completely, and the inner shield portion 3 shields the inner opening 50 and the outer periphery of the inlet filler pipe 7 completely. Accordingly, the shield member 1 according to Example No. 1 can inhibit water from entering the vicinity of the fuel supply opening 70 completely without enlarging an outside diameter of the fuel lid 61.

Since the shield member 1 according to Example No. 1 has the configuration (1), it can completely inhibit water from flowing out of the guiding portion 200 to the outer opening 60, and a larger amount of water can be guided by the guiding portion 200. Accordingly, the shield member 1 according to Example No. 1 can inhibit water from entering the vicinity of a fuel supply opening more reliably.

Further, since the shield member 1 according to Example No. 1 has the configuration (2), a cross-sectional area of the groove 26 formed in the dam portion 25 is large. Therefore a large amount of water can be guided by the guiding portion 200. That is, the bottom wall portion 27 elongates in the axial direction of the outer shield portion 2 from the inner peripheral end of the outer shield portion 2, and the erect wall portion 28 continues from the bottom wall portion 27, and elongates in the direction of the outside diameter of the outer shield portion 2. Thus, the dam portion 25 can be formed with the groove 26 having a large cross-sectional area. Accordingly, it is more reliable to inhibit water slipping down the body and then reaching the vicinity of the outer opening 60 from entering the vicinity of the fuel supply opening 70. Provided with the bottom wall portion 27, the guiding portion 200 can receive water slipping down the body and then reaching the vicinity of the outer opening 60 reliably. Provided with the erect wall portion 28, it can completely inhibit water from flowing outside the guiding portion 200. Provided together with the bottom wall portion 27 and the erect wall portion 28, it can completely inhibit water slipping down the body and then reaching the vicinity of the outer opening 60 from entering the vicinity of the fuel supply opening 70. The longer an axial length of the bottom wall portion 27 is, more reliably the guiding portion 200 can receive water slipping down the body and then reaching the vicinity of the outer opening 60. The longer a length in the direction of the outside diameter of the erect wall portion 28 is, more reliably water can be inhibited from flowing outside the guiding portion 200.

Still further, since the shield member 1 according to Example No. 1 has the configuration (2), it has an advantage that it can be manufactured with high accuracy. The shield member 1 according to Example No. 1 can be molded with a mold 8 shown in FIG. 5. The mold 8 consists of an inner mold 81 for molding an inner face of the shield member 1 and an outer mold 82 for molding an outer face of the shield member 1. The outer mold 82 is divided into a first outer mold 82a and a second outer mold (not shown). The first outer mold 82a and the second outer mold are assembled together so as to be integrated. The shield member 1 molded with the mold 8 is detached in the following manner. Firstly, the first outer mold 82a and the second outer mold are opened. Secondly, the shield member 1 is stripped off from the inner mold 81. The shield member 1 can be stripped off from the inner mold 81 manually. As a result, even when the shield member 1 has an undercut shape with respect to the inner mold 81, the shield member 1 can be detached relatively easier by stretching the shield member 1 so as to strip off from the inner mold 81. On the other hand, the first outer mold 82a and the second outer mold are mechanically opened. Accordingly, when the degree of undercut shape of the shield member 1 with respect to the first outer mold 82a and the second outer mold is large, a mold releasing property of the shield member 1 deteriorates and a molding accuracy decreases.

In the shield member 1 according to Example No. 1, the bottom wall portion 27 elongates in the axial direction of the outer shield portion 2 from the inner peripheral end of the outer shield portion 2, and the erect wall portion 28 elongates in the direction of outside diameter of the outer shield portion 2. Accordingly, the mold 8 for molding the shield member 1 according to Example No. 1 can, as shown in FIGS. 5 and 6, be designed such that the parting line 85 between the inner mold 81 and the outer mold 82 to be on the whole periphery of the outer shield portion 2 so as to have a same circular arc. In this way, the undercut shape of the dam portion 25 with respect to the outer mold 82 can be eliminated. Accordingly, the shield member 1 according to Example No. 1 has an excellent mold releasing property and can be molded with high accuracy. Moreover, as shown in FIGS. 5 and 6, the parting line 85 can be designed to be on the whole periphery of the outer shield portion 2 so as to have the same circular arc. In this way, not only that designing and working of the mold 8 are made easier but also that the shield member 1 can be manufactured with high accuracy.

Example No. 2

Figure 7:
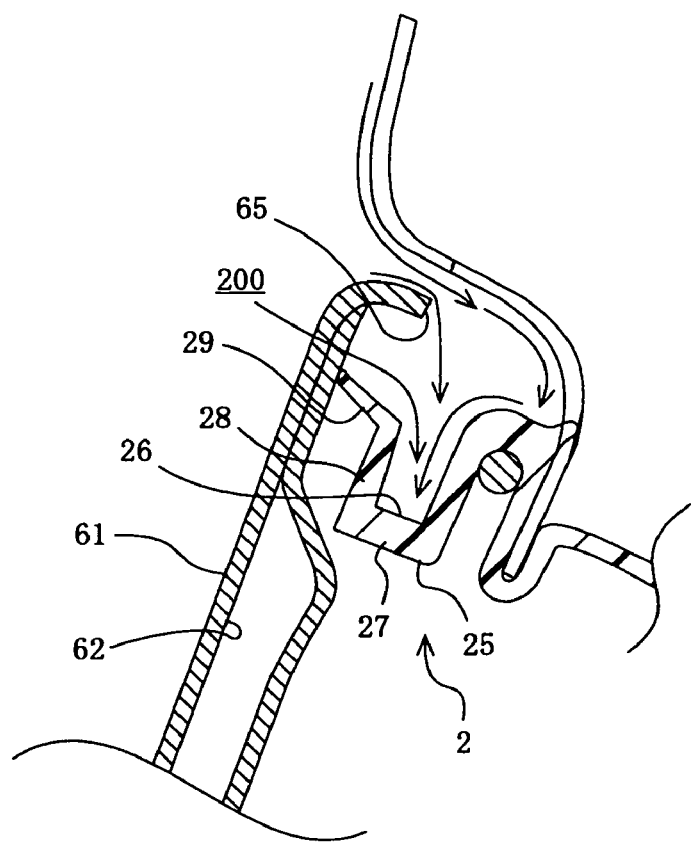
FIG. 7 is an enlarged view for schematically illustrating a major part of a shield member according to Example No. 2.

A shield member according to Example No. 2 has the configurations set forth in (1) to (4). Except that a dam portion has a lip, the shield member according to Example No. 2 is identical with that of Example No. 1. FIG. 7 is an enlarged view for schematically illustrating a major part of the shield member according to Example No. 2.

In the shield member according to Example No. 2, as shown in FIG. 7, a dam portion 25 has an elastically deformable lip 29 at its tip end. More specifically, the lip 29 is formed at a tip end in the direction of the outside diameter of an erect wall portion 28 of the dam portion 25. The lip 29 elastically contacts with a rear surface 62 of a fuel lid 61.

In the shield member according to Example No. 2, water dribbling down from an end 65 of the fuel lid 61 to the vicinity of an outer opening 60 can be guided to a guiding portion 200 by the lip 29. To put it differently, in the shield member according to Example No. 2, water dribbling down from the end 65 of the fuel lid 61 is shut by the lip 29 so as not to enter inside the outer opening 60. Accordingly, it is more reliable to prevent water from reaching the vicinity of a fuel supply opening 70. It is particularly preferable that the lip 29 elongates from the tip end in the direction of the outside diameter of the erect wall portion 28 to an axial direction of the outer shield portion 2. However, not limited to this, the lip 29 may be formed at a tip end of the dam portion 25.

Example No. 3

Figure 8:
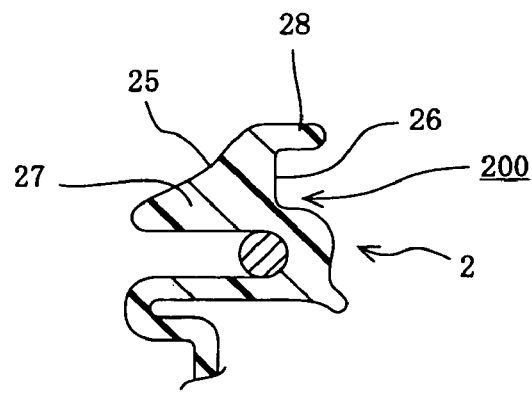
FIG. 8 is an enlarged view for schematically illustrating a major part of a shield member according to Example No. 3.
Figure 9:
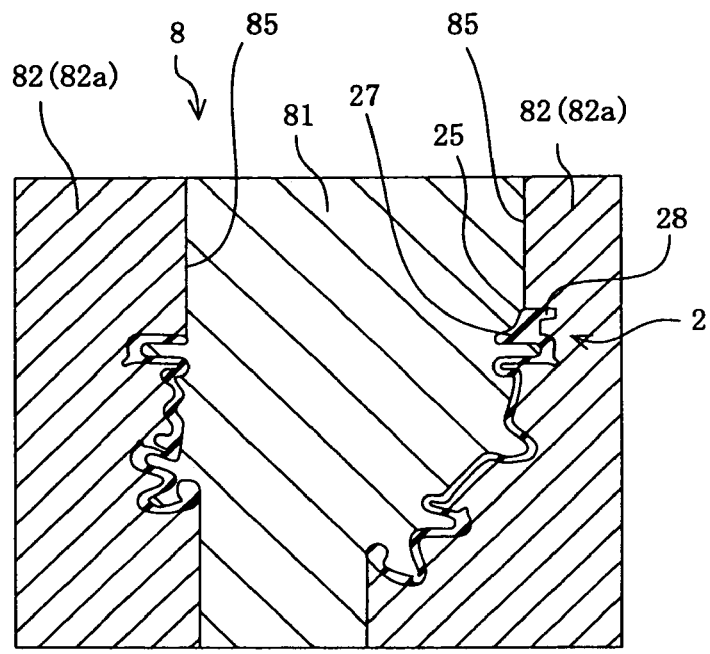
FIG. 9 is a cross sectional view for schematically illustrating a mold for molding the shield member according to Example No. 3.
Figure 10:
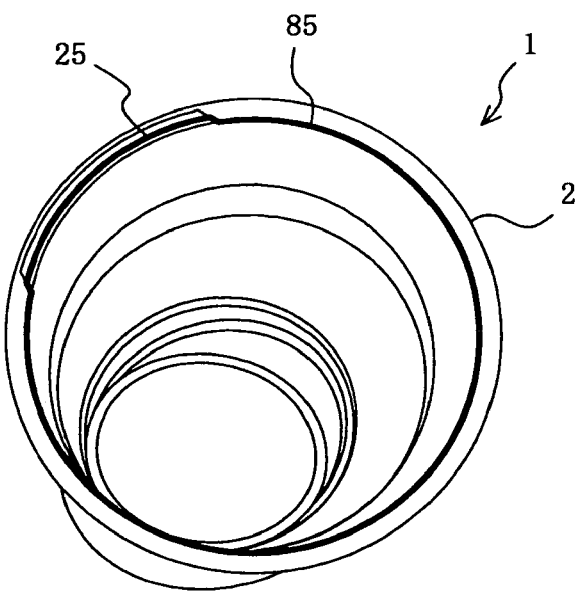
FIG. 10 is a perspective view for schematically illustrating a parting line of the mold shown in FIG. 9.

A shield member according to Example No. 3 has the configurations set forth in (1) and (3). Except a shape of a dam portion, the shield member according to Example No. 3 is identical with that of Example No. 1. FIG. 8 is an enlarged view for schematically illustrating a major part of the shield member according to Example No. 3. FIG. 9 is a cross sectional view for schematically illustrating a mold for molding the shield member according to Example No. 3. FIG. 10 is a perspective view for schematically illustrating a parting line of the mold shown in FIG. 9. Note that, FIG. 10 shows the parting line of the mold shown in FIG. 9 modeled on the shield member according to Example No. 3.

In the shield member according to Example No. 3, a peripheral length of a dam portion 25 is, similarly to Example No. 1, ¼ or more of a peripheral length of an outer shield portion 2. A bottom wall portion 27 of the dam portion 25 elongates from an inner peripheral end of the outer shield portion 2. The bottom wall portion 27 elongates to cross with respect to an axial direction of the outer shield portion 2. An erect wall portion 28 continues from the bottom wall portion 27, and elongates in the direction of an outside diameter of the outer shield portion 2. In the shield member according to Example No. 3, an inner surface of the dam portion 25 and an end face of an axial direction of a first ring holding portion 20 form a guiding portion 200. The guiding portion 200 is formed as a gutter which is a substantially U-shape in section.

In the shield member according to Example No. 3, the bottom wall portion 27 elongates to cross with respect to the axial direction of the outer shield portion 2. Accordingly, the shield member 1 according to Example No. 3 has a smaller cross-sectional area of a groove 26 formed in the dam portion 25 than that of the shield member 1 according to Example No. 1. However, even in the shield member according to Example No. 3, water which has reached the vicinity of the dam portion 25 flows inside the guiding portion 200 so as to be guided along the peripheral direction of the outer shield portion 2. Therefore, also in the shield member according to Example No. 3, water slipping down a body does not enter a vicinity of a fuel supply opening.

Also, similarly to the shield member according to Example No. 1, the outer shield portion 2 shields an outer opening of an outer side member, and an inner shield portion directly shields an inner opening of an outer wheel housing and an outer periphery of an inlet filler pipe in the shield member according to Example No. 3. As a result, similarly to the shield member according to Example No. 1, the shield member according to Example No. 3 can inhibit water from entering the vicinity of the fuel supply opening completely without enlarging an outside diameter of a fuel lid to be large.

The shield member according to Example No. 3 can be molded with a mold 8 shown in FIG. 9. The mold 8 consists of an inner mold 81 for molding an inner face of the shield member 1 and an outer mold 82 for molding an outer face of the shield member 1. The outer mold 82 is divided into a first outer mold 82a and a second outer mold (not shown). The first outer mold 82a and the second outer mold are assembled together so as to be integrated.

In the shield member according to Example No. 3, the bottom wall portion 27 elongates in a direction to cross the axial direction of the outer shield portion. Accordingly, the parting line 85 between the inner mold 81 and the outer mold 82 can, as shown in FIGS. 9 and 10, be formed at different positions in a radial direction between a portion in which the dam portion 25 is formed and a position other than that. It is more difficult to design the mold 8 for molding the shield member according to Example No. 3 than to design the mold 8 for forming the shield member 1 according to Example No. 1, since the parting line 85 is formed at different positions in a radial direction between the portion in which the dam portion 25 is formed and the position other than that. Moreover, the shield member according to Example No. 3 has a lower molding accuracy than that of the shield member 1 according to Example No. 1. However, since there is no an undercut shape of the dam portion 25 with respect to the outer mold 82, the shield member according to Example No. 3 has an excellent mold releasing property and can be molded with high enough accuracy.

Example No. 4

Figure 11:
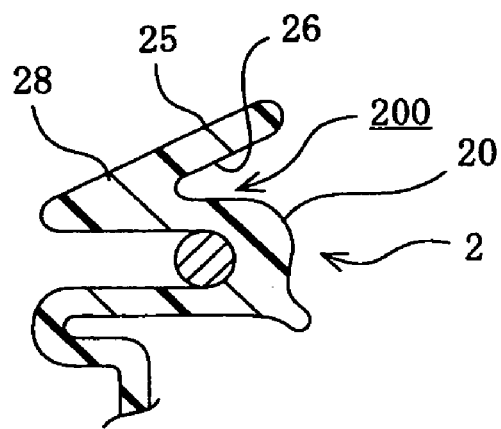
FIG. 11 is an enlarged view for schematically illustrating a major part of a shield member according to Example No. 4.

A shield member according to Example No. 4 has the configurations set forth in (1) and (3). Except a shape of a dam portion, the shield member according to Example No. 4 is identical with that of Example No. 1. FIG. 11 is an enlarged view for schematically illustrating a major part of the shield member according to Example No. 4.

In the shield member according to Example No. 4, a peripheral length of a dam portion 25 is, similarly to Example No. 1, ¼ or more of a peripheral length of an outer shield portion 2. In the shield member according to Example No. 4, the dam portion 25 has an erect wall portion 28 only. The erect wall portion 28 elongates from an inner peripheral end of the outer shield portion 2. The erect wall portion 28 elongates to cross with respect to an axial direction of the outer shield portion 2. In the shield member according to Example No. 4, an inner surface of the dam portion 25 and an end face of an axial direction of a first ring holding portion 20 form a guiding portion 200. The guiding portion 200 is formed as a gutter which is a substantially V-shape in section.

The shield member according to Example No. 4 does not have a bottom wall portion, and the erect wall portion 28 elongates in a direction to cross the axial direction of the outer shield portion 2. Accordingly, the shield member according to Example No. 4 has a smaller cross-sectional area of a groove 26 formed in the dam portion 25 than that of the shield member 1 according to Example No. 1. However, even in the shield member according to Example No. 4, similarly to the shield member according to Example No. 1, water which has reached the vicinity of the dam portion 25 flows inside the guiding portion 200 so as to be guided along the peripheral direction of the outer shield portion 2. Therefore, also in the shield member according to Example No. 4, water slipping down a body does not enter a vicinity of a fuel supply opening.

Moreover, in the shield member according to Example No. 4, similarly to the shield member according to Example No. 1, the outer shield portion 2 shields an outer opening of an outer side member, and an inner shield portion directly shields an inner opening of an outer wheel housing and an outer periphery of an inlet filler pipe. As a result, similarly to the shield member according to Example No. 1, the shield member according to Example No. 4 can inhibit water from entering the vicinity of the fuel supply opening completely without enlarging an outside diameter of a fuel lid.

In a mold for forming the shield member according to Example No. 4, similarly to the mold for molding the shield member according to Example No. 3, a parting line between an inner mold and an outer mold is formed at different positions in a radial direction between a portion in which the dam portion 25 is formed and a position other than that. Accordingly, it is more difficult to design the mold for molding the shield member according to Example No. 4 than to design the mold for forming the shield member according to Example No. 1. Moreover, the shield member according to Example No. 4 has a lower molding accuracy than that of the shield member according to Example No. 1. However, since there is no an undercut shape of the dam portion 25 with respect to the outer mold, the shield member according to Example No. 4 has an excellent mold releasing property and can be molded with high accuracy.

Example No. 5

Figure 12:
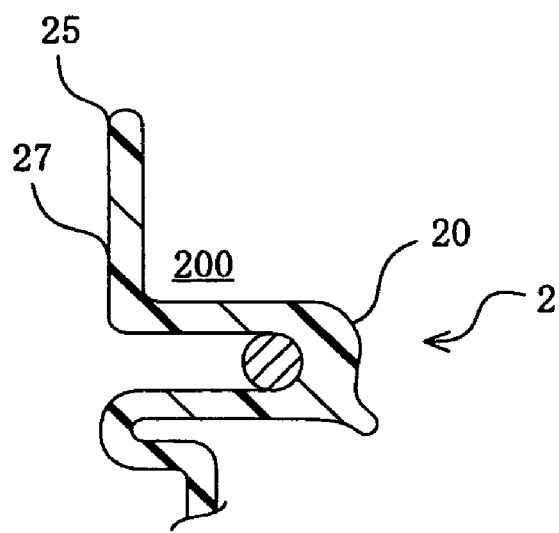
FIG. 12 is an enlarged view for schematically illustrating a major part of a shield member according to Example No. 5.
Figure 13:
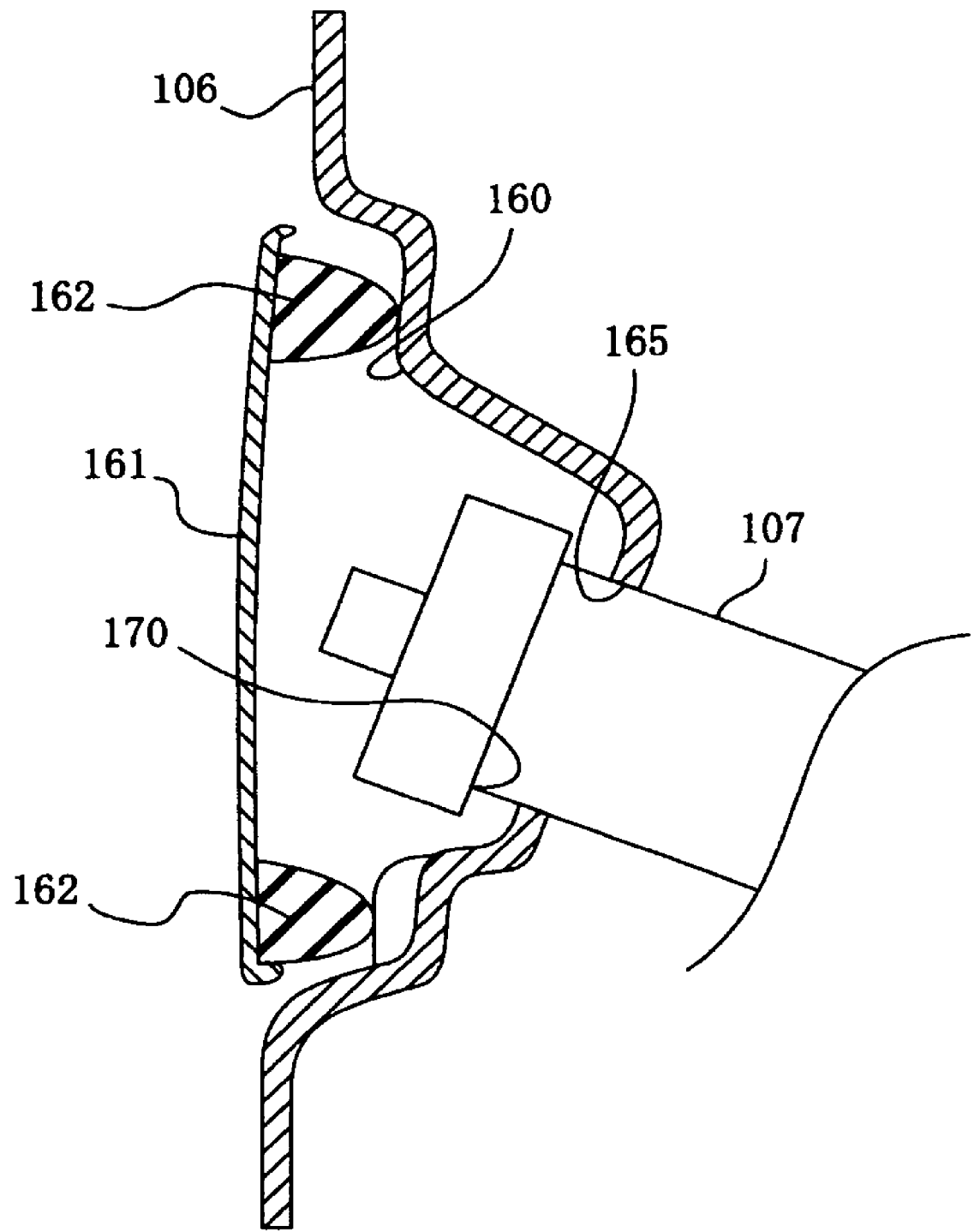
FIG. 13 is a cross sectional view for schematically illustrating a vicinity of a conventional fuel supply opening of a vehicle.

A shield member according to Example No. 5 has the configurations set forth in (3). Except a shape of a dam portion, the shield member according to Example No. 5 is identical with that of Example No. 1. FIG. 12 is an enlarged view for schematically illustrating a major part of the shield member according to Example No. 5.

In the shield member according to Example No. 5, a peripheral length of a dam portion 25 is, similarly to Example No. 1, ¼ or more of a peripheral length of an outer shield portion 2. In the shield member according to Example No. 5, the dam portion 25 has a bottom wall portion 27 only. The bottom wall portion 27 elongates from an inner peripheral end of the outer shield portion 2 in an axial direction of the outer shield portion 2. In the shield member according to Example No. 5, an inner surface of the dam portion 25 and an end face of an axial direction of a first ring holding portion 20 form a guiding portion 200. The guiding portion 200 is formed as a gutter which is a substantially L-shape in section.

The shield member according to Example No. 5 does not have an erect wall portion, and the bottom wall portion 27 elongates in the axial direction of the outer shield portion 2. Accordingly, in the shield member according to Example No. 5, the dam portion 25 does not have a groove. However, even in the shield member according to Example No. 5, similarly to the shield member according to Example No. 1, water which has reached the vicinity of the dam portion 25 flows inside the guiding portion 200 so as to be guided along the peripheral direction of the outer shield portion 2. Therefore, also in the shield member according to Example No. 5, water slipping down a body does not enter a vicinity of a fuel supply opening.

Moreover, in the shield member according to Example No. 5, similarly to the shield member according to Example No. 1, the outer shield portion 2 shields an outer opening of an outer side member, and an inner shield portion directly shields an inner opening of an outer wheel housing and an outer periphery of an inlet filler pipe. As a result, similarly to the shield member according to Example No. 1, the shield member according to Example No. 5 can inhibit water from entering the vicinity of the fuel supply opening completely without enlarging an outside diameter of a fuel lid to be large.

Accordingly, a mold for molding the shield member according to Example No. 5 can, similarly to the mold for forming the shield member according to Example. No. 1, be designed such that the parting line between an inner mold and an outer mold to be on the whole periphery of the outer shield portion 2 so as to have a same circular arc. Therefore, in the shield member according to Example No. 5, similarly to the shield member according to Example No. 1, designing and working of the mold are easy, and the shield member can be manufactured with high accuracy.

Having now fully described the present invention, it will be apparent to one of ordinary skill in the art that many changes and modifications can be made thereto without departing from the spirit or scope of the present invention as set forth herein including the appended claims.

What is claimed is:

1. A shield member, having a cylindrical shape, comprising:
    an outer shield portion formed as an annular shape, and shielding an inner periphery of an outer opening formed in an outer side member in a vehicle body;
    an inner shield portion formed as an annular shape, and shielding at least one of an inner periphery of an inner opening formed in an outer wheel housing of the vehicle body and an outer periphery of an inlet filler pipe disposed inside said inner opening; and
    a connecting portion having a cylindrical shape, and connecting said outer shield portion with said inner shield portion, wherein:
    said outer shield portion is provided with a dam portion at its top portion at least thereof disposed at a top end of said outer shield portion when said shield member is assembled with said outer opening, and said dam portion protrudes in an axial direction of said outer shield portion and elongating in a peripheral direction of said outer shield portion; and
    a surface of said dam portion and a surface of said outer shield portion form a gutter-like guiding portion.

2. The shield member set forth in claim 1, wherein:
    said dam portion has a groove which opens at an outer peripheral side of said outer shield portion and elongates in the peripheral direction of said outer shield portion.

3. The shield member set forth in claim 1, wherein:
    said dam portion has a bottom wall portion which elongates in the axial direction of said outer shield portion from an inner peripheral end of said outer shield portion and an erect wall portion which continues from said bottom wall portion and elongates in a direction of an outside diameter of said outer shield portion.

4. The shield member set forth in claim 1, wherein:
a peripheral length of said dam portion is ¼ or more of a peripheral length of said outer shield portion.

5. The shield member set forth in claim 1, wherein:
said dam portion has an elastically deformable lip at its tip end, said lip elastically contacting with a rear surface of a fuel lid which shields said outer opening.

* * * * *